(12) United States Patent
Weiss et al.

(10) Patent No.: US 6,758,979 B1
(45) Date of Patent: Jul. 6, 2004

(54) METHOD AND REACTOR FOR DECONTAMINATING GROUND WATER

(75) Inventors: Holger Weiss, Panitzsch (DE); Georg Teutsch, Wannweil (DE)

(73) Assignee: UFZ-Umweltforschungzentrum Leipzig-Halle GmbH, Leipzig (DE)

(*) Notice: Subject to any disclaimer, the term of this patent is extended or adjusted under 35 U.S.C. 154(b) by 0 days.

(21) Appl. No.: 09/868,416

(22) PCT Filed: Dec. 16, 1999

(86) PCT No.: PCT/EP99/10011
§ 371 (c)(1),
(2), (4) Date: Oct. 15, 2001

(87) PCT Pub. No.: WO00/35812
PCT Pub. Date: Jun. 22, 2000

(30) Foreign Application Priority Data

Dec. 17, 1998 (DE) .......................... 198 60 129

(51) Int. Cl.[7] .................................................. C02F 1/00
(52) U.S. Cl. .................. 210/747; 210/170; 405/128.45; 166/265; 166/50
(58) Field of Search ................................. 210/170, 747; 166/265, 279, 50; 405/128.45

(56) References Cited

U.S. PATENT DOCUMENTS

| | | | |
|---|---|---|---|
| 4,404,622 A | | 9/1983 | Cherry |
| 4,919,568 A | * | 4/1990 | Hurley .................. 210/747 |
| 5,143,606 A | * | 9/1992 | Bernhardt .............. 210/170 |
| 5,362,394 A | | 11/1994 | Blowes et al. |
| 5,403,476 A | * | 4/1995 | Bernhardt .............. 210/170 |
| 5,534,154 A | | 7/1996 | Gillham |
| 5,730,871 A | * | 3/1998 | Kennedy et al. ........ 166/265 |
| 5,910,245 A | * | 6/1999 | Bernhardt et al. ...... 210/170 |
| 6,224,770 B1 | * | 5/2001 | Savage et al. .......... 210/747 |

FOREIGN PATENT DOCUMENTS

| | | |
|---|---|---|
| DE | 3722653 | 7/1987 |
| DE | 3931012 | 9/1989 |
| DE | 4001011 | 1/1990 |
| DE | 4221198 | 6/1992 |
| DE | 4407835 | 4/1994 |
| DE | 4425061 | 7/1994 |
| DE | 19715038 | 4/1997 |
| DE | 19735920 | 8/1997 |
| WO | WO9108176 | 11/1989 |

OTHER PUBLICATIONS

Patent Abstracts of Japan M-1282 (1992), vol. 16/No. 331:JP-4-97028(A).

Rott, U., Meyerhoff, R. "In situ Aufbereitung von Grundwasser in Kombination mit Horizonalfilterbrunnen," Wasser & Boden 49, 1997 3, S. 7–10.

* cited by examiner

*Primary Examiner*—Christopher Upton
(74) *Attorney, Agent, or Firm*—Goodwin Procter LLP; Brian L. Wamsley

(57) ABSTRACT

The invention concerns a method and a reactor for the decontamination of ground water with the use of the vertical shaft technology from the well drilling technique, of the manufacture of horizontal filter wells and of reaction agents.

The task assignment of the invention, to develop a method and a reactor of the type described in the beginning of this document, with which a cost-favorable and selective ground water extraction from random horizons for the selective and reliable treatment (decontamination) are ensured, is solved in such a way that the contaminated ground water (5) in a random height below the ground water level (9) is directed into a reactor (1,2) and conducted through a reaction chamber (1) with at least one reaction agent (2) in dependence on the desired residence duration period and is discharged as cleansed ground water (4) in a desired height from the reactor (1,2) where the height of the ground water inlet into the reactor (1,2) is selected depending on the type of the pollutant and the location of the pollutant in the ground water (8).

9 Claims, 3 Drawing Sheets

METHOD AND REACTOR FOR DECONTAMINATING GROUND WATER

DESCRIPTION

The invention concerns a method and a reactor for the decontamination of ground water in accordance with the generic terms 1 and 6.

Numerous methods for the decontamination of ground water are already known up to the present time.

DESCRIPTION OF THE RELATED ART

In the DE 44 25 061 C1 a permeable treatment bed is described for the cleansing of contaminated ground water currents in situ as a ditch erected transversely to the ground water current flow, reaching to a point below the ground water bottom fond, and loaded with filling material removing the ground water contaminating substances or converting in the water. Within and along the ditch, a double-wall permeable for the ground water is envisaged which contains the filling material in its intermediate space. As a result of the length of the cleansing route section within the double wall, there is a more or less adequate contacting time of the ground water with the filling material. The ground water is not selectively but, in its entirety and within the structural-technical measure, is contained, treated and discharged again.

In the DE 42 21 198 C2 a method is described for the removal of water-soluble absorbable pollutants from exiting ground water in the sediments of the surroundings of a contamination source with the help of a narrow wall. In this case, in the way of the exiting ground water a slot is applied which is filled with sorption material. In the way of the exiting ground water, and in the direction of flow downstream of the first slot, a second slot is applied in the sediments and filled with sorption material, as soon as the sorption material in the first slot is loaded up to the level of saturation. This process is continued at random.

In the WO 91/08176 a method is described for the cleansing of ground water contaminated with chlorinated or with halogen-containing organic substances (CKW).

With respect to this, it is proposed that the CKW-contaminated water be channelled for defined holding times through hermetically enclosed metal bodies and that oxygen access be thoroughly avoided in the process. For this purpose it is proposed to excavate a drainage ditch in the water-transporting layer and to locate the metal body in this.

In the DE-A-197 15 038, a description is given for a water-permeable filter wall and a method for making the filter wall to the in-situ ground water cleansing which functions according to the "funnel-and-gate" principle.

The use of the filter wall is bound to certain prerequisites, allowing in particular no consideration of the vertical pollutant distribution and, relevant hereto, the minimization of the water quantities to be cleansed. The use in greater depths is not established. The measure involved here is purely passive.

Furthermore, the problem of cleansing contaminated ground water is also dealt with in the documents U.S. Pat. No. 5,534,154, U.S. Pat. No. 5,487,622 and U.S. Pat. No. 5,362,394.

With all methods known up to the present time, the entire construction-technical contained aquifer areas are treated and again discharged on a broad front. The horizontal current flow calls for a construction width which allows the residence time as required for the degradation of pollutants. Gate, slot or ditch widths are required in sizes of ten meters and more, and these result in high costs.

The invention is therefore based on the task assignment of developing a method and a reactor of the category mentioned at the introduction to this document, with which a cost-favorable and selective ground water extraction from random horizons are ensured for selective and reliable treatment (decontamination).

In accordance with the invention, this task assignment is solved by the features of the claims 1 and 3. According to the invention, the contaminated ground water is directed into a reactor at a random height below the ground water level, and conducted through a reaction chamber with at least one reaction agent in dependence of the required residence duration period, and directed as cleansed ground water at a required height from the reactor, where the height of the input of the ground water into the reactor is selected in accordance with the pollutant type and the pollutant location in the ground water.

For decontamination, the contaminated water flows vertically through a drop shaft designed as a reactor and containing the reactive material.

The reactor according to the invention is located, according to the known drop shaft technology, into a point in the bottom fond of the horizon which conducts the contaminated water.

The reactor has a reaction chamber with at least one feed line and at least one outlet line (gravel casing well, outlet flow wake). The reaction chamber contains at least one reaction agent and reaches up to the reactor base and is closed off below the ground water level.

The coupling of the drop shaft technology with known methods of redevelopment technology provides for hydraulic advantages such as the possibility of the selective ground water extraction from almost random horizons in the required scope. This option is a major advantage for a series of cases of damage. It is frequently the case that contaminations are not evenly distributed in the ground water but are concentrated in certain horizons. For this reason and for decontamination purposes, only this part of the ground water must be extracted and treated. In addition, the treated ground water can be discharged in random depth zones of the aquifer.

In order to cover the scope of pollutants which are heavier than water, and in accordance with an embodiment of the invention, the ground water is conducted to the reactor in the lower zone and discharged as cleansed ground water below the ground water level from the upper zone of the reactor.

In order to cover the scope of pollutants which are lighter than water, oil for example, and in accordance with an embodiment variant of the invention, the ground water is conducted to the reactor in the upper zone below the ground water level and also discharged again after the contaminated ground water, for the purpose of achieving a longer residence duration period in the reactor, was first directed downwards and then upwards along an intermediate wall which is open in the lower zone of the reactor.

In order to cover the scope of pollutants which are in the middle area of the ground water column, for example suspended substances or pollutants in the island areas made from clay/loam for example, and in accordance with a further embodiment of the invention, the ground water is conducted to the reactor in the middle zone and directed along an intermediate wall in a downward direction and, from there, along an intermediate wall into the upper zone of the reactor and withdrawn below the ground water level.

With the previously known "funnel-and-gate"-slot or ditch technology, the entire construction-technical contained aquifer areas are, by contrast, treated and discharged again on a broad front. With the known methods, the horizontal flow current demands a structural width which makes possible the necessary residence time required for pollutant degradation. As the current flow velocity must always be greater than the natural ground water flow velocity and, in the case of complex pollutant mixtures or with substances difficult to metabolize, degradation times of more than ten days are required, gate-, slot- or ditch widths of ten meters and more are required and this leads to an extraordinary cost increase of the construction. The same applies for the depth of the necessary structures. Structures previously realized according to the known methods reach only a few meters in depth. By means of the method according to the invention, vertical flow current lengths (residence times) up to the difference well depth—pressure water level can be realized and pumping would not be necessary in this case. The coverage of larger ground water currents can be achieved by the connection of several wells through non-permeable walls.

Advantageous further developments of the invention result from the subclaims.

BRIEF DESCRIPTION OF THE DRAWINGS

The features of the invention will be better understood from the following description of a most preferred embodiment of a reactor. The drawings illustrate the following:.

Figure 1:
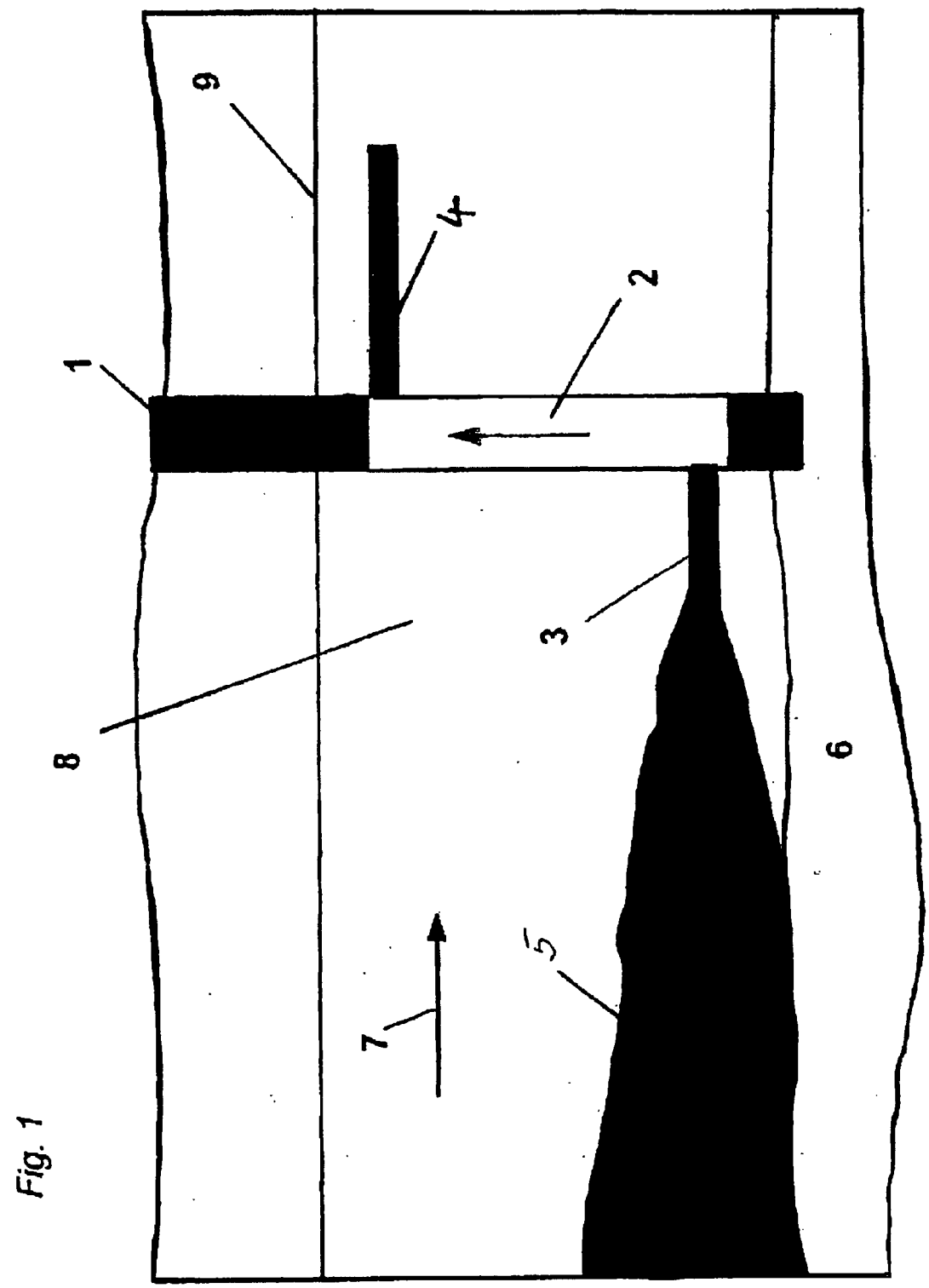
FIG. 1 a schematic illustration of the reactor according to the invention in working position for pollutants heavier than water, FIG. 2 a schematic illustration of the reactor according to FIG. 1 for pollutants lighter than water and FIG. 3 a schematic illustration of the reactor according to FIG. 1 for pollutants in the middle region For the decontamination of contaminated ground water 5 (pollutant wake) in various layers, and based on the method according to the invention, the contaminated water is routed immediately from the contaminated water layer 5 by way of feed lines (horizontal drainage), for example gravel casing well 3, into a drop shaft 1 where the reactive material 2 is located, and where the drop shaft 1 has a vertical current flow. The drop shaft 1 is positioned in the non-permeable horizon 1 in such a way that its location in the ground water direction of flow 7 is upstream of the pollutant wake 5.

The FIG. 1 shows in a schematic arrangement the design in principle of a reactor for executing the method according to the invention, consisting of the drop shaft 1 and the reactive material 2 contained therein, for pollutants which are heavier than water and which are subsequently located in the lower part of the aquifer.

The drop shaft 1 of the reactor is, for example, formed from concrete segments with a height of 2.5 m and an internal diameter of 3 m and a shaft depth of 20 m, with its foundation up and into the non-permeable horizon 6. The drop shaft 1 is filled with reactive materials 2 such as $Fe^\circ$ and indicates in the lower region, in the immediate target horizon, gravel casing wells 3 which, for example, are projecting 10 m long into the aquifer. By way of this water capacitance in the lower region of the ground water-carrying layer 8, the contaminated ground water 5, based on the hydraulic properties and without pumping, is conducted into the shaft 1 which is filled with reaction materials 2. The ground water fed in for decontamination flows vertically (arrow direction) through the reaction material 2 (according to dimensioning) and is then infiltrated in the upper region of the water-carrying layer 8, meaning, it is drawn off below the ground water level 9 (outlet flow wake 4).

Figure 2:
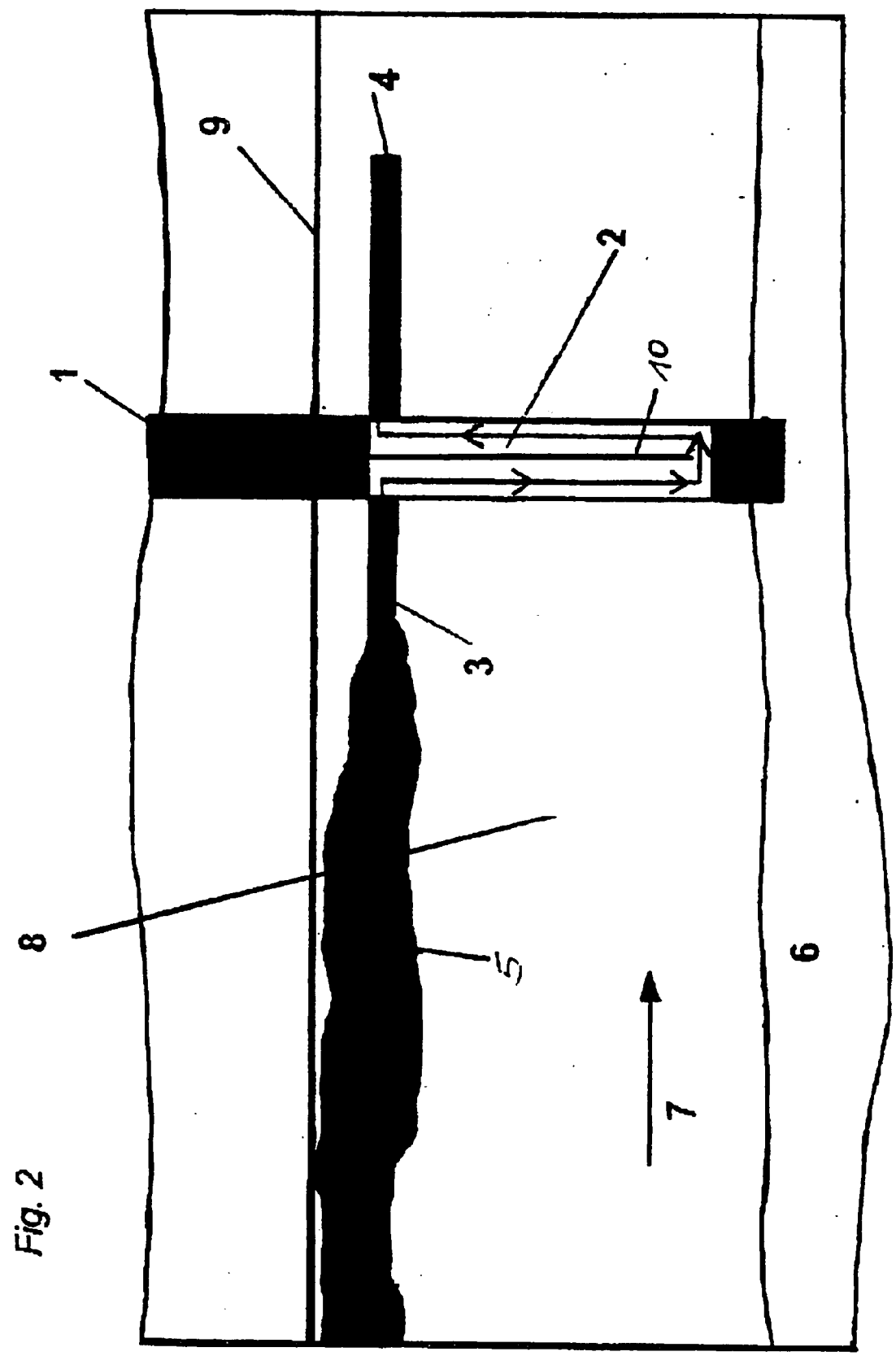

The FIG. 2 shows in a schematic arrangement the configuration of the reactor for a situation where the pollutants are lighter than water and, subsequently, are directed into the reactor in the upper region of the water-carrying layer 8 by way of horizontal gravel casing wells 3.

The contaminated water 5 is directed at first through the reactive material 2 in the drop shaft 1, possibly by means of a non-illustrated pump, vertically and in a downward direction at an open intermediate wall 10 in the bottom zone of the drop shaft 1, and then diverted upwardly, and then conducted out below the ground water level 9 (outlet flow wake 4).

Figure 3:
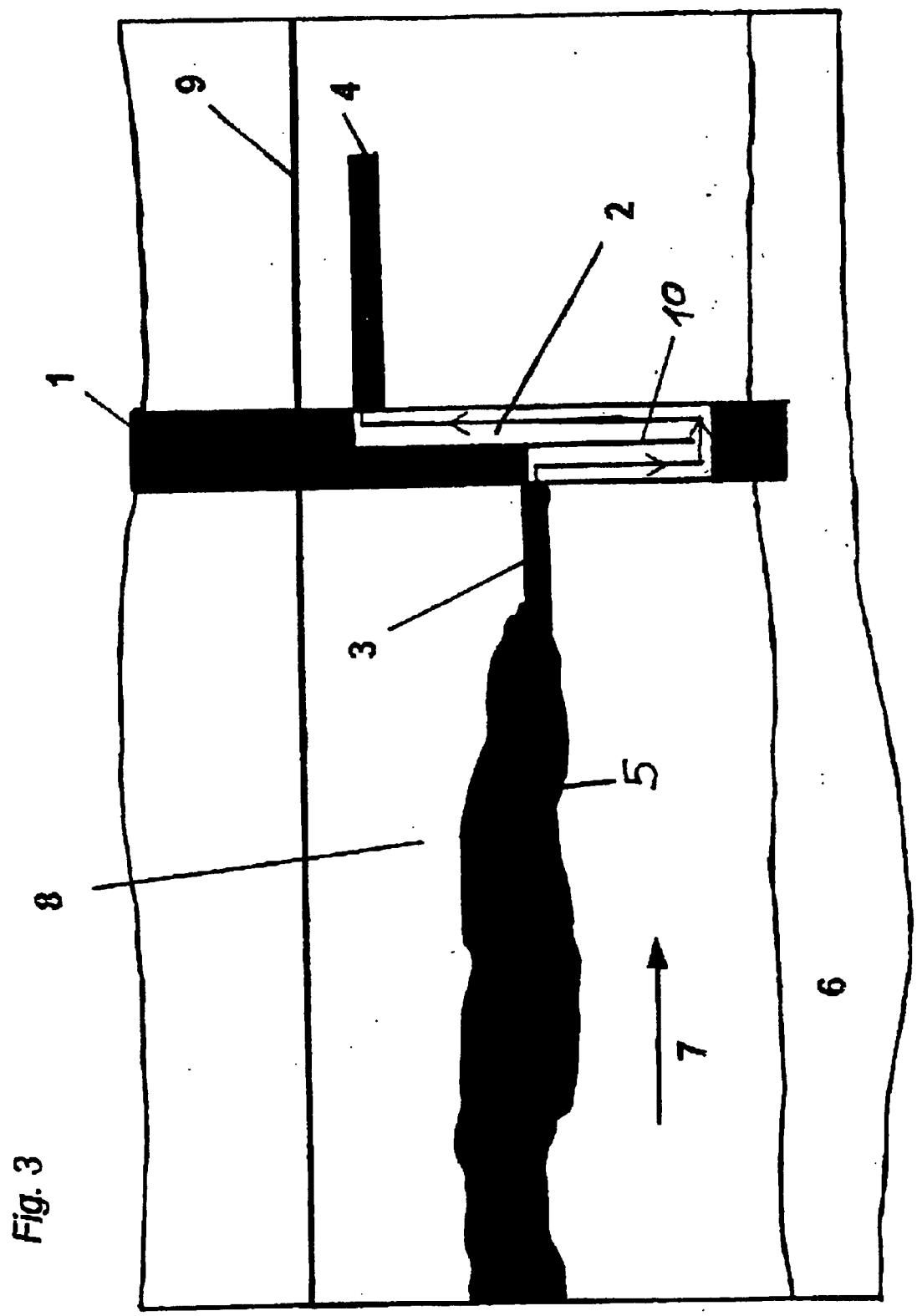

The FIG. 3 shows in schematic arrangement the configuration of the reactor consisting of the drop shaft 1 with the reactive material 2 for the case that the pollutants are located in the middle region of the water-carrying layer 8.

From the drop shaft 1, the horizontal gravel casing wells 3 are driven immediately into the target horizon with the contaminated water 5, the contaminated water 5 is led into the drop shaft 1 and, as in example 2, routed through the reactive material 2 of the drop shaft 1 and conducted out below the ground water level 9 (outlet flow wake 4).

The use of pumps is only then necessary in exceptional cases if the self-pressure is inadequate particularly where unconfined aquifers are concerned.

The invention is not limited to the embodiments described in this document. Moreover, it is possible to realize further embodiment variants by means of combination and modification of the features described above, without departing from the framework of the invention.

REFERENCE NUMBERS LIST

1 Drop shaft
2 Reactive material
3 Gravel casing well (feed line, horizontal drainage)
4 Outlet flow wake (discharge)
5 Pollutant flow wake (contaminated water)
6 Non-permeable horizon
7 Ground water—direction of flow
8 Ground water carrying layer
9 Ground water level
10 Intermediate wall

What is claimed is:

1. A method for decontamination of ground water, comprising:

leading into a reactor at an inlet contaminated ground water at a random height below ground water level through a horizontally extending feed line;

conducting said contaminated ground water through a vertically oriented reaction chamber with at least one reaction agent for a required time period; and discharging cleansed ground water at a required height out of said reactor through a horizontally extending outlet line;

wherein said height of said inlet is selected depending on pollutant type and pollutant location of said ground water.

2. The method for decontamination of ground water according to claim 1 further comprising:

wherein when said pollutants are heavier than water;

conducting said contaminated ground water to said reactor in a lower region; and discharging cleansed ground water below said ground water level from an upper region of said reactor.

3. The method for decontamination of ground water according to claim 1 further comprising:

wherein when said pollutants are lighter than water;

conducting said contaminated ground water to said reactor in an upper region below said ground water level;

for purposes of achieving a longer residence duration period in said reactor, directing said contaminated ground water downwards and then upwards along an intermediate wall that is open in a lower region of said reactor; and discharging cleansed ground water.

4. The method for decontamination of ground water according to claim 1 further comprising:

wherein when said pollutants are in a middle region of ground water carrying layer;

conducting said contaminated ground water to said reactor in a middle region directing said contaminated ground water along an intermediate wall into an upper region of said reactor; and discharing cleansed ground water below said ground water level.

5. The method for decontamination of ground water according to claim 1 wherein said at least one feed line is a perforated feed line.

6. The method for decontamination of ground water according to claim 1 wherein said at least one feed line is a gravel casing well.

7. A reactor for decontaminating ground water in a well manufactured in a drop shaft comprising:

a reaction chamber for accommodating at least one reaction agent within said drop shaft;

at least one feed line extending horizontally from said drop shaft and communicating with said reaction chamber;

at least one outlet line extending horizontally from said drop shaft and communicating with said reaction chamber;

wherein said outlet line is located below ground water level; and wherein said reaction chamber is closed off below said ground water level.

8. The reactor of claim 7 further comprising:

at least one intermediate wall within said reaction chamber;

wherein said intermediate wall is open in an upward or a downward position.

9. The reactor of claim 7 wherein at least two reactors are connected together.

* * * * *